United States Patent

Luxem et al.

(10) Patent No.: US 6,684,049 B2
(45) Date of Patent: Jan. 27, 2004

(54) PROCEDURE AND DEVICE FOR MEASURING THE THICKNESS OF A LIQUID LAYER ON A ROLLER OF A PRINTING PRESS

(75) Inventors: Wolfgang Eberhard Luxem, Kiel (DE); Holger Runkowske, Fahren (DE)

(73) Assignee: NexPress Solutions LLC, Rochester, NY (US)

(*) Notice: Subject to any disclaimer, the term of this patent is extended or adjusted under 35 U.S.C. 154(b) by 36 days.

(21) Appl. No.: 10/098,003

(22) Filed: Mar. 14, 2002

(65) Prior Publication Data

US 2002/0131797 A1 Sep. 19, 2002

(30) Foreign Application Priority Data

Mar. 17, 2001 (DE) .......................... 101 13 014
Sep. 13, 2001 (DE) .......................... 101 45 025

(51) Int. Cl.[7] .............................................. G03G 15/20
(52) U.S. Cl. ........................................................ 399/325
(58) Field of Search ................................. 399/325, 324, 399/326, 327

(56) References Cited

U.S. PATENT DOCUMENTS 5,112,642 A  5/1992  Wajid ........................ 427/10
5,493,374 A * 2/1996  Smith et al.
6,457,361 B1 * 10/2002  Takeuchi et al. .............. 73/580

FOREIGN PATENT DOCUMENTS

| DE | 40 35 240 C2 | 10/1991 |
| DE | 43 23 449 A1 | 1/1994 |
| JP | 8-160799 | * 6/1996 |

\* cited by examiner

*Primary Examiner*—Quana M. Grainger
(74) *Attorney, Agent, or Firm*—Lawrence P. Kessler

(57) ABSTRACT

A procedure and device for measuring the thickness of a liquid layer, in particular an oil layer, on the rollers of printing presses. The mass of the liquid layer in the printing press is measured by a measuring device and that the thickness of the liquid layer on the roller be determined on the basis of the measured mass of the liquid layer. The measuring device preferably contains a piezoelectric sensor in a quartz microbalance, which picks up the frequency changes on the basis of the mass applied to the surface or on the basis of changes in the mass and converts them into corresponding masses or mass changes on the basis of the liquid layer. Furthermore, a control device is provided which controls the application of fluid on the roller as a function of the masses or mass changes determined.

12 Claims, 2 Drawing Sheets

PROCEDURE AND DEVICE FOR MEASURING THE THICKNESS OF A LIQUID LAYER ON A ROLLER OF A PRINTING PRESS

FIELD OF THE INVENTION

The invention relates to a procedure and a device for measuring the thickness of a liquid layer.

BACKGROUND OF THE INVENTION

A toner material is applied to a paper sheet by an electrophotographic printing press and subsequently set in the paper sheet. For this purpose, highly heated rollers are used, that effectively set the toner material with high pressure and heat by embossing, and which grip the paper sheet from below. The counteracting force below the paper sheet is provided by the impression cylinder or an intermediate cylinder. The problem with this customary procedure is that between the heater rollers and the paper sheet stock, particularly the toner material on the stock, adhesive forces are produced which hinder the separation of the heated rollers from the stock. As a remedy, an oil layer is applied by an arrangement of heated rollers, sometimes called metering and donor rollers, which ensures a loosening of the heated rollers from the stock following the setting of the toner material.

In order to avoid any adverse effects, it must be ensured that the oil layer thickness always lies within a certain range and that its value is neither too big nor too small. If the oil layer thickness is too small, the adverse effects mentioned above occur, and if the oil layer thickness is too thick, the disadvantages lie in the printing results being oily and/or too shiny. Also, particularly with two-sided printing, a too thick oil layer can result in the soiling of the printing press due to the oil used. It is thus desirable that the oil layer thickness on the heated rollers for setting the paper sheets or on setting rollers or on metering or donor rollers, which the oil layer applies to the heated rollers, be set at a certain value. Up until now, this has been solved by applying an oil layer to the heated setting rollers on the paper sheet in the printing press for test purposes and measuring the oil layer thickness on this paper sheet in the laboratory by a spectroscopic procedure. Apart from this costly testing procedure, an oiling system was established by an operator, who used the delivery device and metering or donor rollers for applying an oil layer based on the oil layer thickness estimated by a test paper sheet and metering and donor rollers. It was expected that an oil layer thickness on the rollers in the order of several hundred nanometers delivered the best printing results.

SUMMARY OF THE INVENTION

It is the purpose of this invention to determine the thickness of the liquid layer, in particular that of an oil film on a roller, in a simple manner that would save time and be cost-effective. To achieve this task, a procedure and a device are provided in which the mass of a liquid layer is measured in the printing press by a measuring device, and from the measured mass of the liquid layer thickness, the thickness of the liquid layer on the roller is determined.

In particular, it is advantageous that an addition is provided to a control unit for controlling a delivery unit for delivering liquid on the basis of the liquid thickness calculated from the mass. By the use of a rotary encoder, the position of the roller and the location of the roller at which the measurement of the mass takes place can be determined. Of particular advantage is the use of several measuring devices on various places on the roller, so that the mass of the liquid layer at various places on the roller and consequently a distribution pattern of the liquid can be determined. The distribution pattern provides the solution of the important problem of the various thickness of the liquid layer at various places on the roller. In order not to impair the surface characteristics of the roller, the measuring device is inserted in the rubber sheath of the roller. The measuring device is surrounded by heat protection against the heated roller.

The invention, and its objects and advantages, will become more apparent in the detailed description of the preferred embodiment presented below.

BRIEF DESCRIPTION OF THE DRAWINGS

The following figures are used to explain exemplary embodiments of the invention. The figures include.

DETAILED DESCRIPTION OF THE INVENTION

Figure 1:
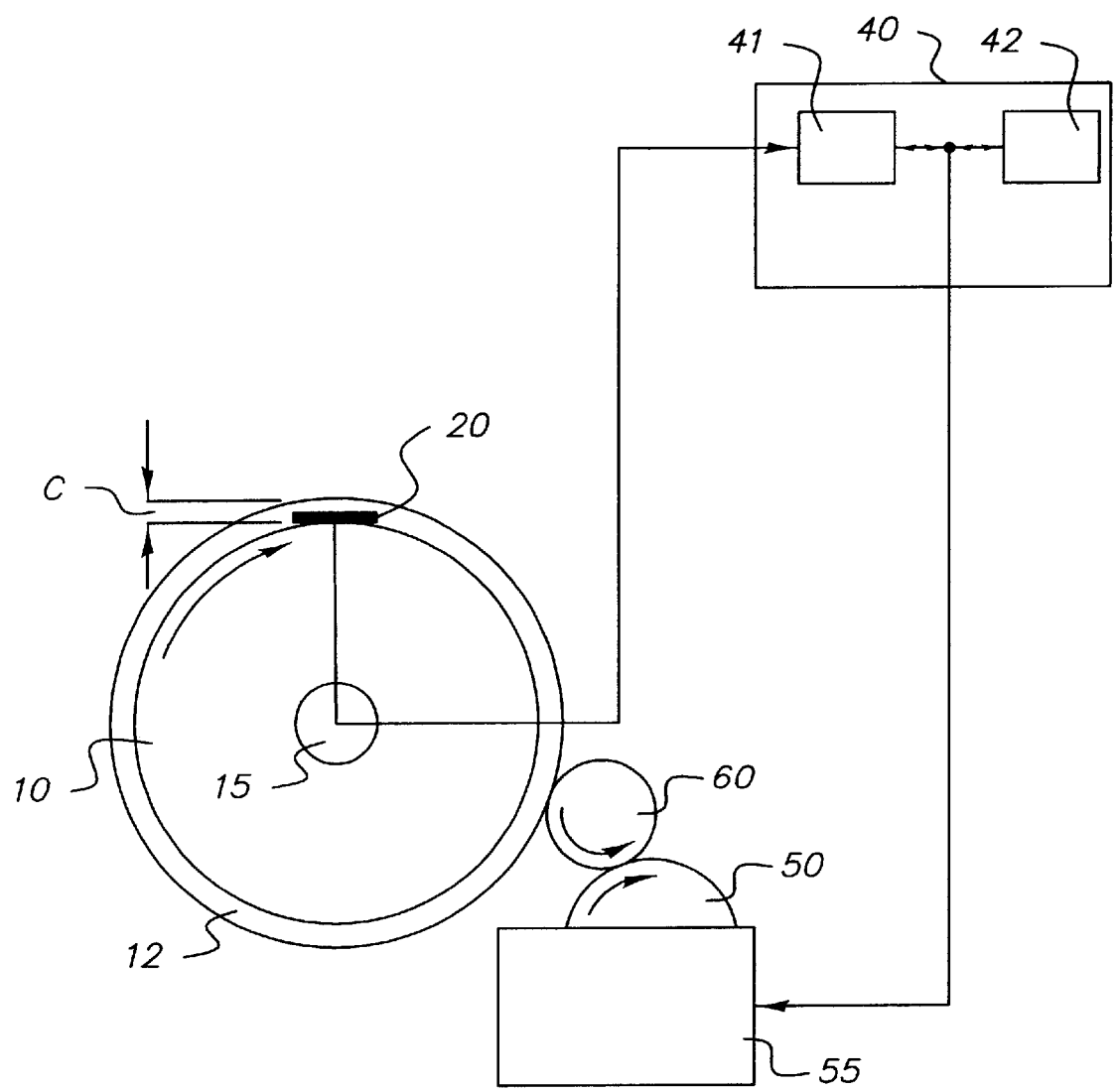
FIG. 1 which is a schematic side view of an embodiment of the invention with one roller, an oiling system, a measuring device and a circuit block with a computer and a control unit.

FIG. 1 illustrates a schematic side view of a roller 10 with a delivery device 55 and a measuring device 20 for measuring a mass. The computer 41 and the control unit 42 are illustrated in a circuit block and are subsequently combined as the computer and control unit 40. In the customary manner, roller 10 is provided with an oil film as the liquid layer 12 by the delivery device 55 via a donor roller 60 and a metering roller 50, which is surrounded by the delivery device 55. The oil to be applied to the roller 10 for setting the toner material on paper sheet stock is located in a container of the delivery device 55. The oil is picked up from the surface of the rubber-sheathed donor roller 60, which moves in the direction of the associated arrow, and by touching the metering roller 50 made of metal, is rolled onto the latter. Metering roller 50 rotates in an oil bath of the delivery device 55 on a bonded fabric and moves in the direction of the arrow opposite to the donor roller 60 and transfers an oil film onto the roller 10 by contact.

In FIG. 1, for clarity purposes, in relation to the roller, the oil film or liquid layer 12 has been represented as being considerably thicker. Metering and donor rollers 50 and 60 are driven by roller 10, which is in turn driven by its own drive or, for its part, by friction. Another possibility for applying the oil film to the roller 10 includes passing an oil-soaked cloth on the roller 10.

A measuring device 20 is arranged on the surface of the roller 10. The measuring device 20 is combined with the computer and control unit 40. In order to measure the thickness c of the liquid layer 12, in this case the oil film, the measuring device 20 detects the mass, which is conveyed by the liquid lying on the bearing surface or a measuring surface of the measuring device 20. In the configuration according to FIG. 1, the measuring device 20 contains a quartz microbalance with a thin crystalline quartz disc and two electrodes. An electric AC voltage is applied to the electrodes, and the phenomenon that a change in the mass to the crystal microbalance results in the change of the frequency of the AC voltage applied is utilized. The mass attached to the crystal microbalance can be determined by measuring the frequency and determination of the frequency change in comparison to not having a mass lying on the surface of the crystal microbalance. If the crystal microbalance is covered with the rubber sheathing of roller 10, the mass of the liquid layer 12 is calculated correspondingly from the frequency change in comparison to the mass of the rubber sheathing applied to the surface of the crystal microbalance; the mass of the rubber sheathing is thus taken into consideration.

The change of the frequency $\Delta f$ applied to the surface of the quartz microbalance as the measuring device 20 regarding the mass change $\Delta m$ on the quartz microbalance is calculated by the following mathematical equation:

$$\Delta f = -k^* \Delta m$$

whereby k indicates a mass-sensitive constant. In addition, temperature influences, particularly the heating of setting rollers with the measuring device 20, lead to frequency changes $\Delta f$ and to measurement errors. In order to avoid such measuring errors, the measuring device 20 is enclosed, for example, with a poor heat-conducting material.

The measurement of the frequency change $\Delta f$ occurs at the point in time at which the measuring device 20 is located at the highest point on the roller 10, as illustrated in FIG. 1, and the roller 10 is suspended, in order to correctly determine the mass lying on the surface of the measuring device 20. The highest point of roller 10, which in a diagram corresponds to the positive amplitude of the development of the surface of roller 10, is determined by a rotary encoder 15 on the roller 10. The measured mass or mass change value $\Delta m$ is transferred to the computer and control unit 40 and converted there into the thickness assigned to the liquid layer 12 that is assigned to the mass.

The thickness of the liquid layer 12 is now clearly determined and is stored in the computer unit 41. In FIG. 1, the length c describes the thickness of the liquid layer 12. If the thickness of liquid layer 12 is not within a certain desired range, the computer and control 40 transmits control signals to the delivery unit 55. The control signs cause the amount of liquid delivered by the delivery unit 55 as a function of the calculated thickness value of the liquid layer 12 to be appropriately raised or lowered. Accordingly, the thickness of the liquid layer 12 is controlled in this manner.

Figure 2:
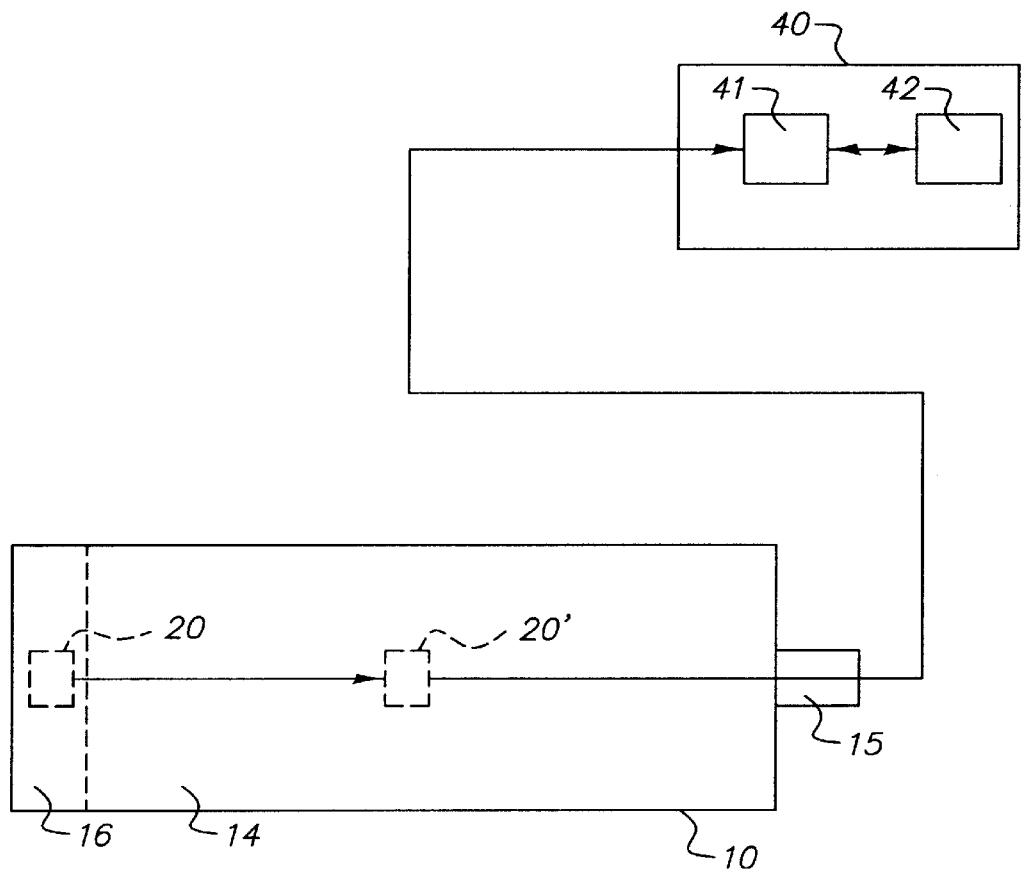
FIG. 2 which shows a variant of the invention similar to FIG. 1 with a front view of the roller with two measuring devices, whereby one measuring device is arranged in an area of a roller with a liquid layer and the other measuring device is arranged in an area of the roller without a liquid layer.

FIG. 2 shows a schematic representation of a variant of the procedure according to the invention. The two measuring devices 20, 20' are arranged in the rubber sheathing of roller 10, and thus the outlines of the measuring devices 20, 20' are indicated with dotted lines. Roller 10 contains a rotary encoder 15 in its shaft. This, along with a device for illustrating the procedure carried out according to FIG. 2 is similar to the procedure in FIG. 1. However, the measurements of the thickness of the liquid layer 12 with and without liquid are not carried out in various successive passages, but are simultaneously carried out with the measuring devices 20, 20'. To this end, an area 16 of the roller 10 is not supplied with liquid, while the other area 14 is supplied with liquid, in this case, an oil film in the customary manner. As is evident in FIG. 2, the two areas 14 and 16 are separated from each other by a dotted line for clarity.

An advantage to this modified procedure is that no measurements are required prior to the operation of the roller 10 and the printing press (not illustrated) with and without the liquid layer 12 and that the measurement procedure can all take place during the operation of the printing press. The masses or mass changes $\Delta m$ of the liquid layer 12 determined are transferred to the computer and control unit 40 via the lines illustrated in FIG. 2. The computer 41 converts the mass data obtained into length data, which identifies the thickness of the liquid layer 12 by, for instance, a look-up table or a classification table. Each mass value is clearly assigned a length value. By comparing the stored length data to those calculated in the look-up table, the computer 41 calculates in addition, whether the respective length value, i.e., a thickness of the liquid layer 12 is a match to the stored desired length values. If there is a match with the stored desired length value, the delivery unit 55 is operated without change, but if there is no match, the computer and control unit 40 controls the delivery unit 55 in such a way, that the delivery unit 55 supplies less or more liquid or oil to roller 10.

Figure 3:
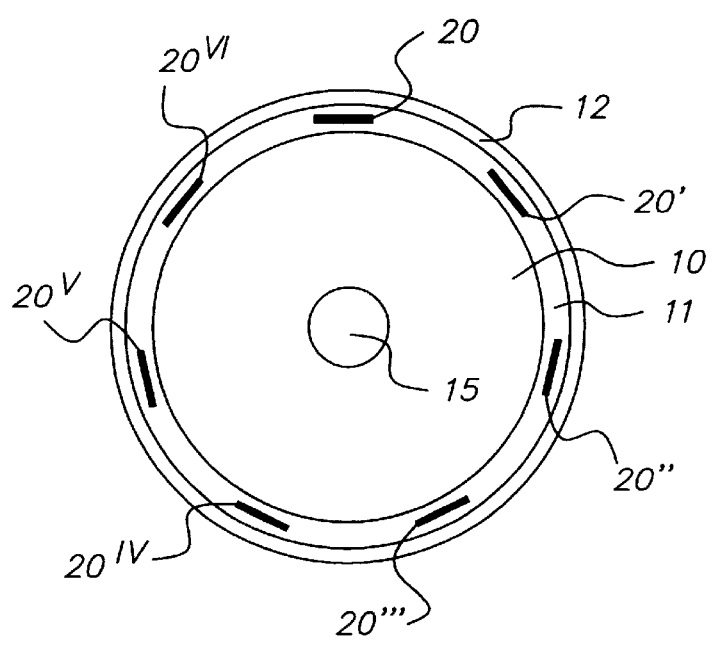
FIG. 3 which is a side view of a roller with several measuring devices.

FIG. 3 shows a side view of a roller 10 of an embodiment of the invention with an elastomeric sheathing 11 and several measuring devices $20$–$20^{VI}$. The roller 10 in FIG. 3 is arranged with a rotary encoder 15 in its shaft, with which the rotational angle of roller 10 can be precisely determined. The rotary encoder 15 is combined with a computer and control unit (similar to element 40 in FIGS. 1 and 2). With the help of the rotary encoder 15, the thicknesses of the fluid are assigned certain rotational angles in the computer and control unit 40, which are assigned corresponding determined positions on the surface of roller 10. In this manner, distribution designs of the thickness of the fluid in various places can be set, which enable a monitoring and control of the distribution of the fluid on roller 10.

This variant is of great importance when using the printing press, since the distribution of the fluid on the roller surface is often uneven. By the collaborative effort effect of the rotary encoder 15 with the individual measuring devices $20$–$20^{VI}$ in the described manner, the delivery unit 55 is controlled in places, and delivers more or less fluid to those places or areas of roller 10, where the measuring devices $20$–$20^{VI}$ measure a smaller or larger mass of the attached fluid of the liquid layer 12. In order to measure the mass of the liquid on the measuring devices $20$–$20^{VI}$ correctly, the measurement is carried out precisely at the point in time at which a measuring device $20$–$20^{VI}$ is located at the highest position of roller 10, which is the measuring device 20 in FIG. 3. Accordingly, the mass of the fluid lying on the surface is precisely measured, since the mass vector at this point is pointing vertical down. In addition, the effects of undesired forces are excluded, such as centrifugal forces due to the turning of the roller, by stopping roller 10 during a test run and then taking the measurements in the "off" position of roller 10.

In a variation, the described procedure can be further applied to determine and to control the oil thickness layer on the metering or donor rollers 50 and 60. Further applications of the invention lie in the measuring and controlling of the thickness of an ink film or a moisture layer in the printer of a printing press.

The invention has been described in detail with particular reference to certain preferred embodiments thereof, but it will be understood that variations and modifications can be effected within the spirit and scope of the invention.

What is claimed is:

1. Procedure for measuring the thickness of a liquid layer (12) on a roller (10) of a printing press, characterized in that the mass of the liquid layer (12) in the printing press is measured by a measuring device (20–20$^{VI}$) and that the thickness of the liquid layer (12) is determined by the measured mass of the liquid layer (12) on the roller (10).

2. Procedure for measuring the thickness of the liquid layer (12) according to claim 1, characterized in that a delivery unit (55) for liquid is controlled on the basis of the determined thickness of the liquid layer (12).

3. Procedure for measuring the thickness of the liquid layer (12) according to claim 1, characterized in that the mass of the liquid layer (12) is measured in various places on the roller (10) and that the measurement results are stored in a computer (14).

4. Procedure for measuring the thickness of the liquid layer (12) according to claim 1, characterized in that the rotational angle of roller (10) is measured by a rotary encoder and the measured rotational angle is assigned to determined places on the roller surface.

5. Device for measuring the thickness of the liquid layer (12) on a roller (10) of a printing press, characterized by at least one measuring device (20–20$^{VI}$) on the roller (10) for the measurement of the mass of the liquid layer (12), including at least one computer (41) for the calculation of the thickness of the liquid layer (12) by the measured mass.

6. Device for measuring the thickness of a liquid layer (12) according to claim 5, characterized in that the measuring device (20–20$^{VI}$) contains at least one piezoelectric sensor.

7. Device for measuring the thickness of a liquid layer (12) according to claim 6, characterized in that the piezoelectric sensor is a quartz microbalance.

8. Device for measuring the thickness of a liquid layer (12) on a roller according to claim 5, characterized in that the roller (10) has a rubber sheathing and the measuring device (20–20$^{VI}$) is inserted in said rubber sheathing.

9. Device for measuring the thickness of a liquid layer (12) on a roller (10) according to claim 5, characterized in that the measuring device (20–20$^{VI}$) has a heat protector.

10. Device for measuring the thickness of a liquid layer (12) on a roller (10) according to claim 5, characterized by several arranged measuring devices (20–20$^{VI}$) being arranged at various positions on the circumference and/or along the length of the roller (10).

11. Device for measuring the thickness of a liquid layer (12) on a roller (10) of a printing press according to claim 5, characterized in that a control unit (42) for controlling a liquid delivery unit (55) on the basis of the thickness of the liquid layer (12) is present.

12. Device for measuring the thickness of a liquid layer (12) on a roller (10) according to claim 5, characterized by a rotary encoder (15) associated with the roller (10) for determining the rotary angles of the roller (10).

* * * * *